UNITED STATES PATENT OFFICE.

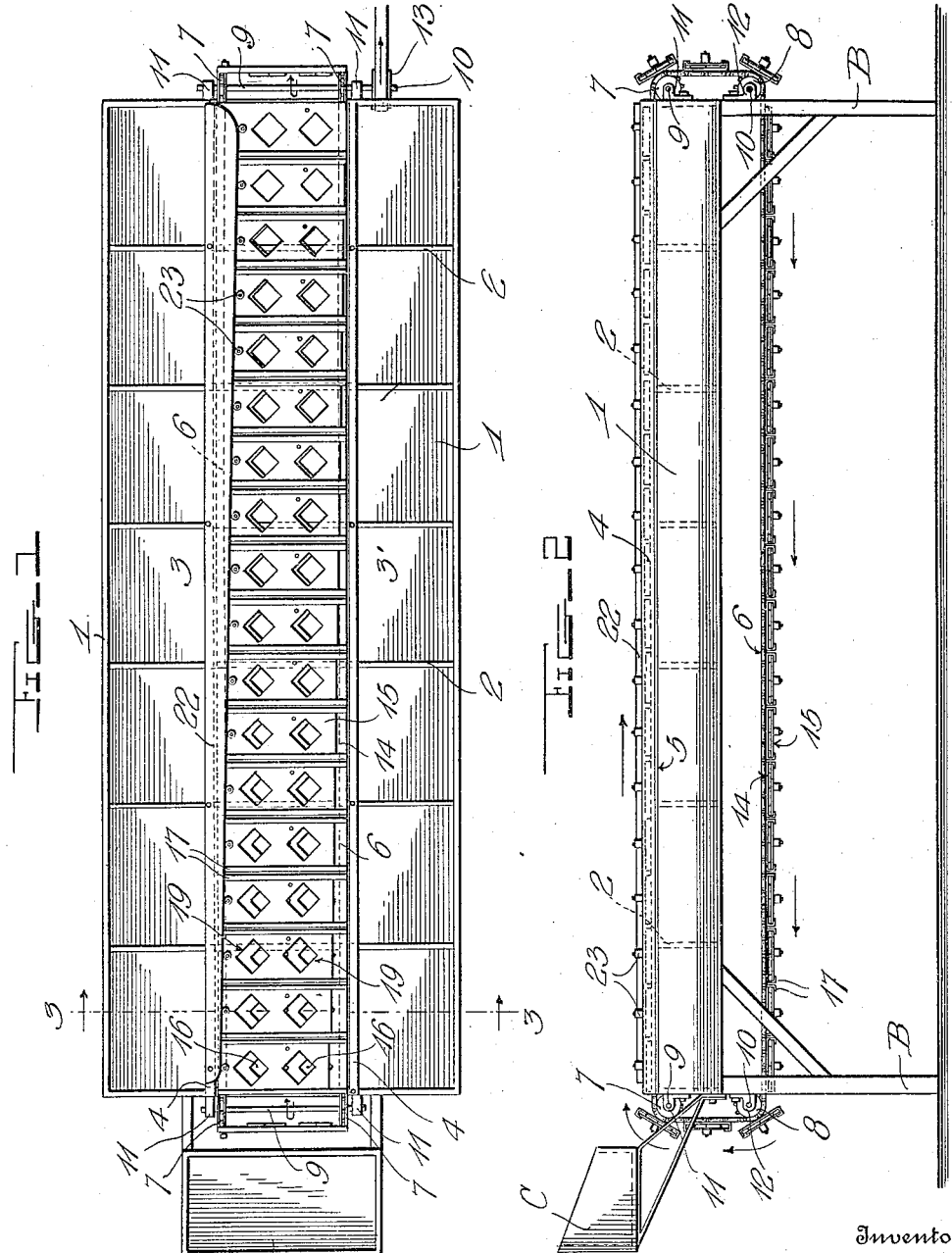

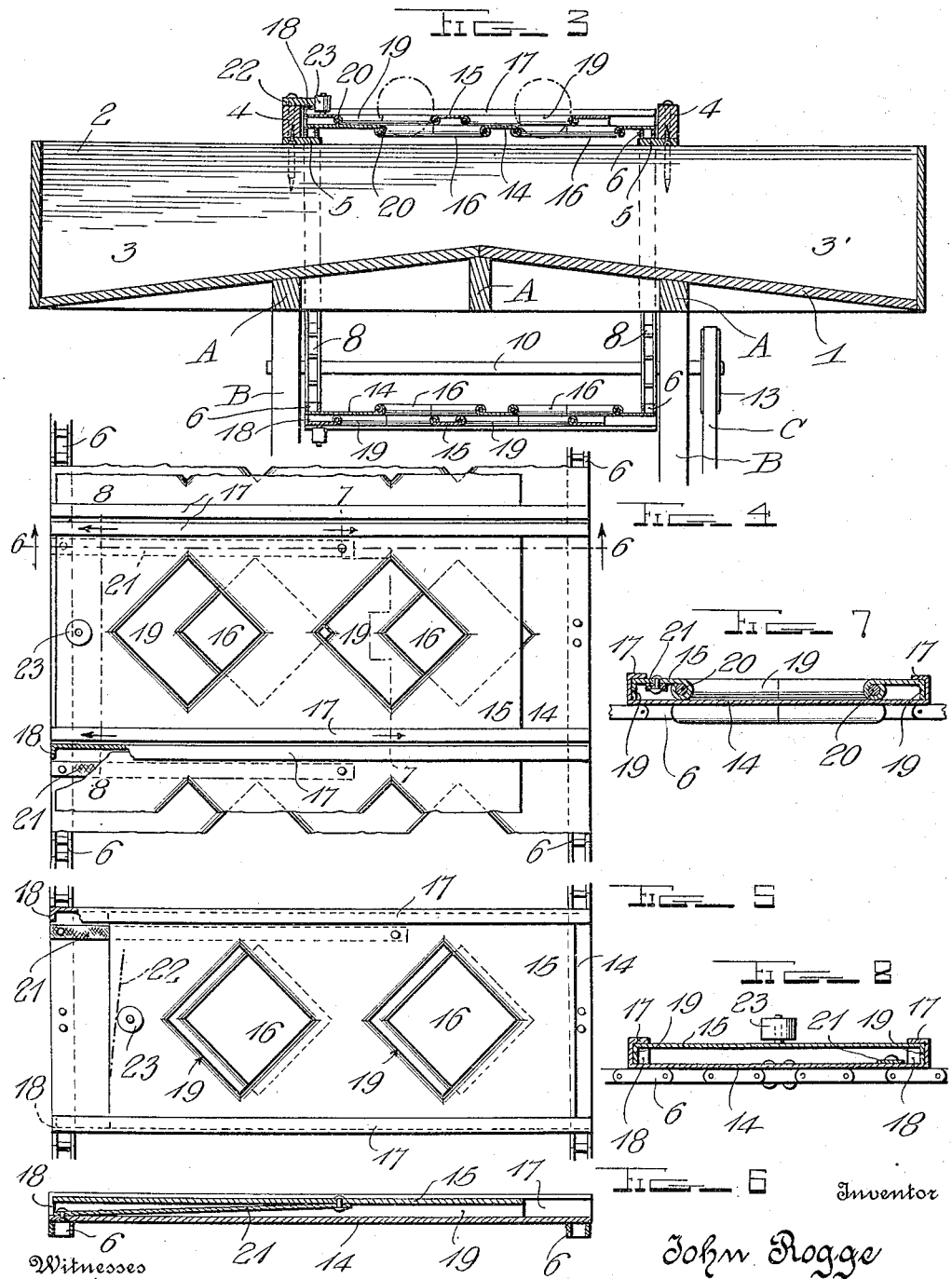

JOHN ROGGE, OF PAYETTE, IDAHO.

MACHINE FOR SIZING FRUIT AND VEGETABLES.

1,146,102.    Specification of Letters Patent.    Patented July 13, 1915.

Application filed November 20, 1913. Serial No. 802,094.

*To all whom it may concern:*

Be it known that I, JOHN ROGGE, a citizen of the United States, residing at Payette, in the county of Canyon and State of Idaho, have invented certain new and useful Improvements in Machines for Sizing Fruit and Vegetables; and I do declare the following to be a full, clear, and exact description of the invention, such as will enable others skilled in the art to which it appertains to make and use the same.

This invention primarily relates to mechanical sizers or fruit sorters, but more particularly to that class which employ an endless conveyer in conjunction with a plurality of segregating compartments to receive the fruit when graded.

A further object is to provide a device of this character which will simultaneously size or grade two different fruits such as apples and oranges, or different kinds of the same fruit in one operation.

A still further object is to provide a novel mechanical means which rapidly handles and sizes the fruit without injuriously affecting the same.

With these and other objects in view, the invention consists of certain novel features of construction, and the arrangement and combination of parts as will be more fully described and claimed.

I attain the foregoing objects by the mechanism illustrated in the accompanying drawings in which—

Figure 1 is a plan view of my improved separator; Fig. 2 is a side elevation thereof; Fig. 3 is a transverse vertical section taken on the line 3—3 of Fig. 1; Fig. 4 is an enlarged fragmentary plan view of the coacting sizing plates illustrating the latter in normal position, a corner of one of the plates being broken away to show their elastic connection; Fig. 5 is an enlarged plan view of a pair of my sizing plates showing the latter in actuated position, a portion of one of the plates being broken away, showing the stop which limits the inward movement of the upper plate; Fig. 6 is a longitudinal vertical section taken on the line 6—6 of Fig. 4; Fig. 7 is a transverse vertical section taken on the line 7—7 of Fig. 4; and Fig. 8 is a similar view taken on the line 8—8 of Fig. 4.

Similar reference numerals refer to similar parts throughout the several views.

In its present embodiment my invention comprises a frame A, which is properly supported by the uprights or standards B, and provided with a hopper C, suitably secured and spaced from one end thereof as clearly shown in Figs. 1 and 2.

The frame A supports a rectangular bin 1, the interior of which is divided by the vertically disposed transversely extending partitions 2 into a series of compartments, which, owing to the inclination of the bin flooring, the latter having a slight downward and outward slope from the central beam of the frame A, are divided into sections 3 and 3'. By constructing the bin in the manner described it will be seen, that as the fruit drops from the moving conveyer, which will be hereinafter referred to, and falls on the inclined flooring of sections 3 and 3', it will gravitate to the outer portion of said sections and there accumulating will be easily accessible for removal therefrom.

Fixedly secured in spaced relation on the edges of the partitions 2, are longitudinally disposed angular guide rails 4, the horizontal part of which forms tracks 5, for the two endless chains 6, which latter travel thereover and around the upper and lower sprocket gears 7 and 8, keyed to shafts 9 and 10 which are journaled in the boxes 11 and 12 disposed respectively on the opposite ends of the bin 1, and between the supports or standards B, as clearly shown in Figs. 1 and 2. One of the lower shafts 12 is provided with a pulley 13 to be driven by a motor or other suitable driving device which is not shown.

To grade the apples or other fruit in the manner set forth, I employ a series of stationary and superimposed movable plates 14 and 15 carried by the endless chains 6 passing over the various compartments of the bin 1. The stationary plate 14 is preferably rectangular in conformation and is provided with two adjacently disposed openings 16 through which the fruit may drop after said openings have been sufficiently enlarged to form an opening having a diameter corresponding to that of the fruit. The longitudinal edges of the plate 14 are bent angularly to form channels 17 having their inner extremities closed by the stops 18. The channels thus formed receive the angularly bent longitudinal edges 19 of the movable plate 15 slidably disposed on said plate 14. Plate 15 is also provided with adjacently disposed openings 19 the area of which corresponds to that of the openings 16 in the stationary plate 14. Both plates have the edges surrounding said openings 16 and 19 rolled and reinforced by the metal strips 20. This not only strengthens the plates, but by reason of the smooth surface formed by said rolled edges protects the fruit from injury as the latter drops through said openings. The movable plate 16 is normally held in engagement with the stops 18 by the elastic band 21 having one end secured to the inner end of said stationary plate 15 and the other end thereof attached to the under surface of the movable plate 15. When the movable plate is in the normal position, above referred to, the opening between said plates will be out of register, the opening in the stationary plate being very nearly closed by the solid portion of the movable plate, but as the latter is caused to travel toward the outer end of the stationary plate the openings in the two plates will be gradually brought into register which therefore gradually enlarges the openings through the two plates, until said openings reach their maximum area which occurs with the registration of the openings in the movable plate with those in the stationary one.

The plate 15 is actuated in the manner described by the angular shunt board 22 secured to the upper edges of one of the angle rails 4, the inner side of said board extending across the path of the rollers 23, which are centrally and vertically arranged on the inner portion of the movable plate 15. Hence it will be seen that as said plates proceed on their course, over the bin 1, the rollers coming in contact with the gradually widening shunt board 22, will cause the movable plate 15 to be slowly actuated across the surface of the stationary plate 14, thereby gradually enlarging the openings between the plates and permitting the different sized fruit to drop into the proper compartment.

In the operation of my device, power is applied to the pulley 13, which operates the chains 6 causing the plates carried thereby to travel over the different compartments of the bin 1; apples or other fruit are then placed unassorted in the hopper C, from whence they are taken in pairs by the operator and placed on the various sizing plates as the latter start on their course over the bin. The apples or other fruit when disposed on the plates, pass through the openings 19 of the movable plate, and rest on the lower or stationary plate 14. As the plates proceed on their course, the shunt board 22 coming in contact with the roller 23, causes the movable plate to gradually enlarge the openings in the stationary plate until the same are large enough to allow the apples or other fruit resting on said stationary plate to drop into the compartment 3—3 from which they may be taken and packed for shipping.

What I claim is:

1. In a fruit grader, relatively movable underlying and superimposed transverse plates having coöperating apertures intermediate their ends forming grading openings, means for producing relative movement between said plates in one direction to dispose the apertures in the respective plates progressively into coincidence to gradually increase the size of said grading openings, guides formed on the longitudinal edges of said underlying plates for coöperation with the corresponding edges of the superimposed plates to slidably receive the latter, stops formed at the inner ends of said guides to limit the inward movement of said superimposed plates, and a spring interposed between said underlying and superimposed plates to connect the former with the latter and yieldingly retain said plates in contact with said stops, whereby the openings in the respective plates are normally out of coincidence, substantially as and for the purpose set forth.

2. In a fruit grader, relatively movable underlying and superimposed transverse plates having coöperating apertures intermediate their ends forming openings, means for producing relative movement between said plates in one direction to dispose the apertures in the respective plates progressively into coincidence to gradually increase the size of the grading openings, said underlying plates having their longitudinal edges upwardly and inwardly extended to form channels to slidably receive the downwardly extended longitudinal edges of the superimposed plates, stops formed at the inner ends of said channels to limit the inward movement of said superimposed plates, and a spring interposed between said superimposed and underlying plates to connect the former with the latter, and to yieldingly retain said superimposed plates in contact with said stops, whereby the openings in the respective plates are normally out of coincidence, substantially as and for the purpose set forth.

In testimony whereof I have hereunto set my hand in presence of two subscribing witnesses.

JOHN ROGGE.

Witnesses:
 CHARLES B. COMPTON,
 WILLIAM F. STROTHER.